US012749341B2

(12) United States Patent
Kinoshita et al.

(10) Patent No.: US 12,749,341 B2
(45) Date of Patent: Sep. 29, 2026

(54) INFORMATION PROCESSING DEVICE AND INFORMATION PROCESSING METHOD

(71) Applicant: SONY GROUP CORPORATION, Tokyo (JP)

(72) Inventors: Masaya Kinoshita, Tokyo (JP); Akira Matsui, Tokyo (JP); Hiroaki Ebi, Tokyo (JP); Akihiko Utsugi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 237 days.

(21) Appl. No.: 18/690,272

(22) PCT Filed: Mar. 17, 2022

(86) PCT No.: PCT/JP2022/012474
§ 371 (c)(1),
(2) Date: Mar. 8, 2024

(87) PCT Pub. No.: WO2023/047658
PCT Pub. Date: Mar. 30, 2023

(65) Prior Publication Data
US 2024/0371200 A1 Nov. 7, 2024

(30) Foreign Application Priority Data
Sep. 22, 2021 (JP) ................................ 2021-153886

(51) Int. Cl.
*G06V 40/16* (2022.01)
*G06F 3/14* (2006.01)
*G06T 7/00* (2017.01)

(52) U.S. Cl.
CPC .............. *G06V 40/174* (2022.01); *G06F 3/14* (2013.01); *G06T 7/0002* (2013.01); *G06T 2207/30168* (2013.01)

(58) Field of Classification Search
CPC ....... G06V 40/174; G06F 3/14; G06T 7/0002; G06T 2207/30168
See application file for complete search history.

(56) References Cited

U.S. PATENT DOCUMENTS

2018/0314881 A1* 11/2018 Sud ...................... A61B 5/6803
2020/0286505 A1* 9/2020 Osborne ................. G06N 7/01

FOREIGN PATENT DOCUMENTS

JP 2005128884 A * 5/2005
JP 2011-166405 A 8/2011
(Continued)

OTHER PUBLICATIONS

International Search Report and Written Opinion of PCT Application No. PCT/JP2022/012474, issued on May 24, 2022, 09 pages of ISRWO.

*Primary Examiner* — Stephen G Sherman
(74) *Attorney, Agent, or Firm* — CHIP LAW GROUP

(57) ABSTRACT

Effective use of a user emotion for each scene of moving image content is enabled. On the basis of a user emotion and video quality for each scene of moving image content A, correlation data obtained by associating the user emotion with the video quality is generated. The user emotion for each scene of moving image content B is predicted on the basis of the video quality for each scene of the moving image content B and the correlation data obtained by associating the user emotion with the video quality related to the moving image content A. For example, the predicted user emotion for each scene of the moving image content B is displayed and used.

16 Claims, 12 Drawing Sheets

100

(56) References Cited

FOREIGN PATENT DOCUMENTS

| | | | |
|---|---|---|---|
| JP | 2014-006912 | A | 1/2014 |
| JP | 2019-506770 | A | 3/2019 |
| JP | 2020-126645 | A | 8/2020 |

* cited by examiner

100

200

FIG. 6
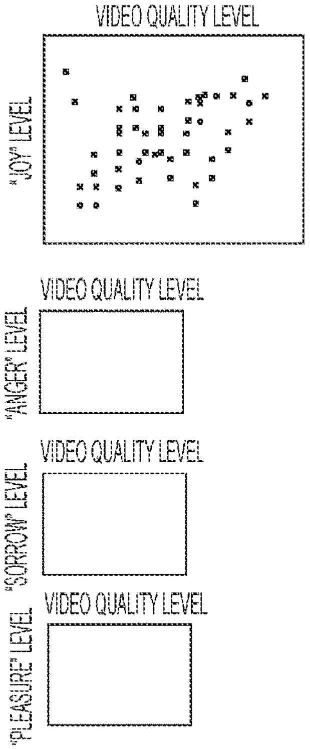
FIG. 7A
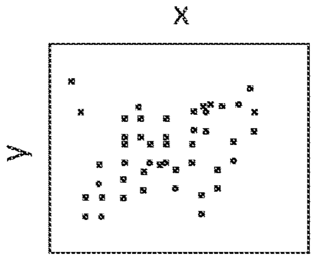
FIG. 7B
REGRESSION EQUATION : $y=ax+b$
$a=0.95$
$b=0.1$
CORRELATION COEFFICIENT
$r = 0.75$
FIG. 7C
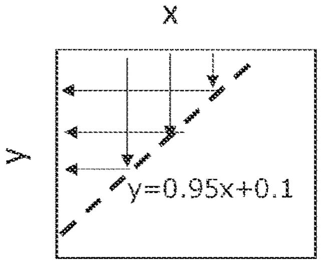

300

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/012474 filed on Mar. 17, 2022, which claims priority benefit of Japanese Patent Application No. JP 2021-153886 filed in the Japan Patent Office on Sep. 22, 2021. Each of the above-referenced applications is hereby incorporated herein by reference in its entirety.

TECHNICAL FIELD

The present technology relates to an information processing device and an information processing method, and more particularly relates to an information processing device and the like that process information regarding moving image content.

BACKGROUND ART

Conventionally, various techniques of generating emotion data indicating a user emotion for each scene of moving image content on the basis of a facial image of a user, biometric information of the user, or the like have been proposed (e.g., see Patent Document 1).

CITATION LIST

Patent Document

Patent Document 1: Japanese Patent Application Laid-Open No. 2020-126645

SUMMARY OF THE INVENTION

Problems to be Solved by the Invention

An object of the present technology is to enable effective use of a user emotion for each scene of moving image content.

Solutions to Problems

A concept of the present technology is directed to:

an information processing device, including:

a data generation unit that generates correlation data obtained by associating a user emotion with video quality on the basis of the user emotion and the video quality for each scene of moving image content.

According to the present technology, the data generation unit generates the correlation data obtained by associating the user emotion with the video quality on the basis of the user emotion and the video quality for each scene of the moving image content. For example, the correlation data may include combination data of the user emotion and the video quality for each scene. In this case, since a large number of pieces of the combination data of the user emotion and the video quality are included as the correlation data, for example, it becomes possible to accurately calculate the user emotion corresponding to the video quality.

Furthermore, for example, the correlation data may include data of a regression equation calculated on the basis of the combination data of the user emotion and the video quality for each scene. In this case, since the correlation data is the data of the regression equation, it becomes possible to save a storage capacity of a database that stores the correlation data, and to easily calculate the user emotion corresponding to the video quality, for example. In this case, for example, data of a correlation coefficient may be added to the data of the regression equation. It becomes possible to determine whether or not to use the regression equation on the basis of the data of the correlation coefficient. Furthermore, for example, the data generation unit may use the user emotion for each user attribute to generate the correlation data for each user attribute. With this arrangement, it becomes possible to selectively use the correlation data of a desired attribute.

As described above, according to the present technology, the correlation data obtained by associating the user emotion with the video quality is generated on the basis of the user emotion and the video quality for each scene of the moving image content, which makes it possible to satisfactorily obtain the correlation data in which the user emotion and the video quality are associated with each other.

Furthermore, another concept of the present technology is directed to:

an information processing device, including:

a user emotion prediction unit that predicts, on the basis of video quality for each scene of moving image content and correlation data obtained by associating a user emotion with the video quality, the user emotion for each scene of the moving image content.

According to the present technology, the user emotion prediction unit predicts the user emotion for each scene of the moving image content on the basis of the video quality for each scene of the moving image content and the correlation data obtained by associating the user emotion with the video quality. For example, the user emotion prediction unit may predict the user emotion for each scene of the moving image content on the basis of the correlation data of a predetermined attribute selected from the correlation data for each user attribute. With this arrangement, the user emotion prediction unit is enabled to obtain emotion data suitable for the attribute desired by a user for use in reproduction and editing of the moving image content.

As described above, according to the present technology, the user emotion for each scene of the moving image content is predicted on the basis of the video quality for each scene and the correlation data obtained by associating the user emotion with the video quality, which makes it possible to satisfactorily predict the user emotion for each scene of the moving image content.

Note that, in the present technology, a display control unit that controls display of the predicted user emotion for each scene of the moving image content may be further included, for example. With this arrangement, the user is enabled to easily recognize the user emotion predicted for each scene of the moving image content, and to easily and effectively perform a selective reproduction operation on the moving image content and an edit operation for performing selective retrieval or video quality correction on the moving image content.

Furthermore, in the present technology, an extraction unit that extracts an emotion representative scene on the basis of the predicted user emotion for each scene of the moving image content may be further included, for example. With this arrangement, it becomes possible to effectively use the predicted user emotion for each scene of the moving image content in reproduction and editing of the moving image content.

For example, the extraction unit may extract the emotion representative scene on the basis of a type of the user emotion. Furthermore, for example, the extraction unit may extract the emotion representative scene on the basis of a degree of the user emotion. In this case, for example, the extraction unit may extract a scene in which the degree of the user emotion exceeds a threshold as the emotion representative scene. Furthermore, in this case, the extraction unit may extract the emotion representative scene on the basis of a statistical value of the degree of the user emotion of the entire moving image content, for example. Here, the statistical value may include, for example, a maximum value, a sorting result, an average value, or a standard deviation value.

Furthermore, in the present technology, a reproduction control unit that controls reproduction of the moving image content on the basis of the extracted emotion representative scene may be further included, for example. With this arrangement, the user is enabled to view only the extracted emotion representative scene or only the remaining parts excluding the extracted emotion representative scene.

The information processing device according to claim 6.

Furthermore, in the present technology, an edit control unit that controls editing of the moving image content on the basis of the extracted emotion representative scene may be further included, for example. With this arrangement, the user is enabled to obtain new moving image content including only the extracted emotion representative scene or only the remaining parts excluding the extracted emotion representative scene, or the user is enabled to obtain new moving image content in which the video quality of only the extracted emotion representative scene or the remaining parts excluding the extracted emotion representative scene is corrected.

BRIEF DESCRIPTION OF DRAWINGS

FIG. 6 is a scatter diagram illustrating another piece of the correlation data including the combination data of the user emotion and the video quality for each frame.

FIGS. 7A, 7B, and 7C are diagrams for explaining a case where the correlation data is data of a regression equation calculated on the basis of the combination data of the user emotion and the video quality for each frame.

MODE FOR CARRYING OUT THE INVENTION

Hereinafter, a mode for carrying out the invention (hereinafter referred to as an "embodiment") will be described. Note that the description will be given in the following order.

1. Embodiment
2. Variations

1. Embodiment

The present technology includes a step of generating emotion data indicating a user emotion for each scene of first moving image content (moving image content A), a step of generating correlation data obtained by associating the user emotion with video quality on the basis of the user emotion and the video quality for each scene of the first moving image content (moving image content A), and a step of predicting and using the user emotion for each scene of second moving image content (moving image content B).

[Exemplary Configuration of Information Processing Device for Generating Emotion Metadata]

Figure 1:
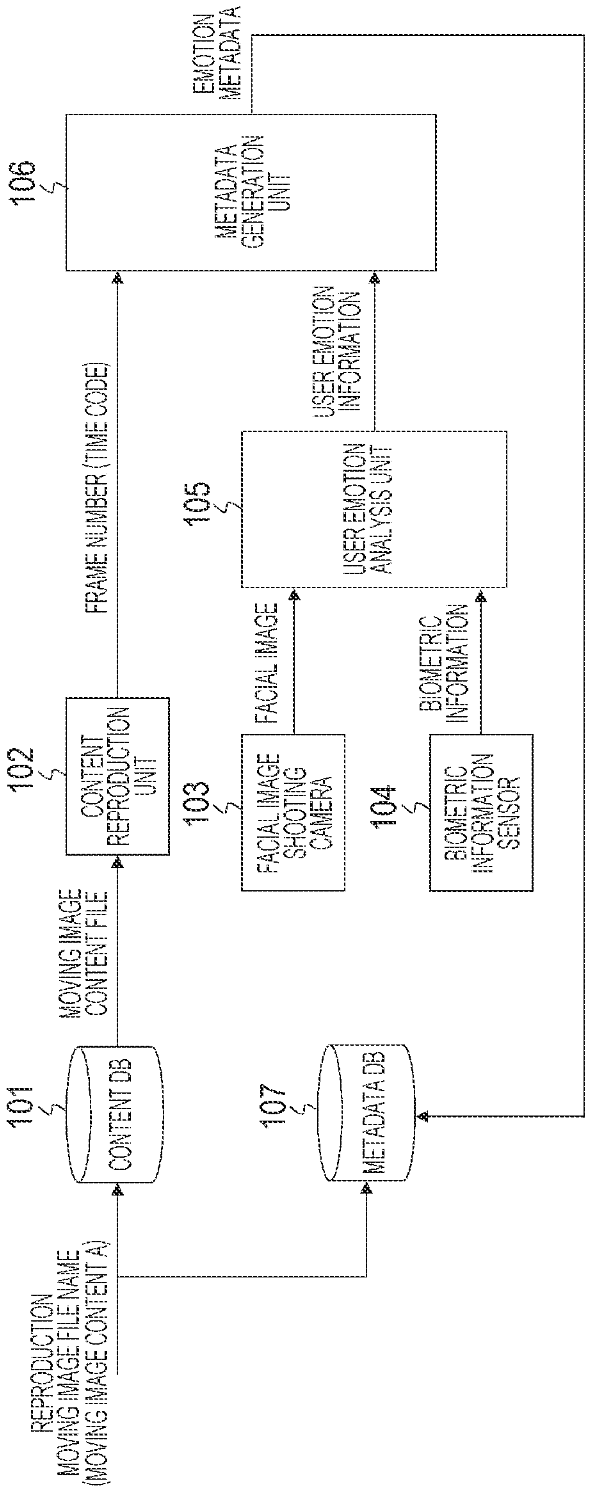
FIG. 1 is a block diagram illustrating an exemplary configuration of an information processing device that generates emotion metadata.

FIG. 1 illustrates an exemplary configuration of an information processing device 100 that generates emotion metadata. The information processing device 100 includes a content database (content DB) 101, a content reproduction unit 102, a facial image shooting camera 103, a biometric information sensor 104, a user emotion analysis unit 105, a metadata generation unit 106, and a metadata database (emotion data DB) 107.

The content database 101 stores a plurality of moving image content files. When a reproduction moving image file name (moving image content A) is input, the content database 101 supplies, to the content reproduction unit 102, a moving image content file including the moving image content A corresponding to the reproduction moving image file name. Here, the reproduction moving image file name is specified by a user of the information processing device 100, for example.

At a time of reproduction, the content reproduction unit 102 reproduces the moving image content A included in the moving image content file supplied from the content database 101, and displays a moving image on a display unit (not illustrated). Furthermore, at the time of reproduction, the content reproduction unit 102 supplies a frame number (time code) in synchronization with a reproduction frame to the metadata generation unit 106. The frame number is information that may identify a scene of the moving image content A.

The facial image shooting camera 103 is a camera that captures a facial image of the user who views the moving image displayed on the display unit by the content reproduction unit 102. The facial image of each frame obtained by being captured by the facial image shooting camera 103 is sequentially supplied to the user emotion analysis unit 105.

The biometric information sensor 104 is a sensor for obtaining biometric information, such as a heart rate, a respiratory rate, a perspiration amount, and the like, which is attached to the user who views the moving image displayed on the display unit by the content reproduction unit 102. The biometric information of each frame obtained by the biometric information sensor 104 is sequentially supplied to the user emotion analysis unit 105.

The user emotion analysis unit 105 analyzes a degree of a predetermined type of the user emotion for each frame on the basis of the facial image of each frame sequentially supplied from the facial image shooting camera 103 and the biometric information of each frame sequentially supplied from the biometric information sensor 104, and supplies user emotion information to the metadata generation unit 106.

Note that the type of the user emotion is not limited to secondary information obtained by analyzing the facial image and the biometric information, such as information regarding "joy", "anger", "sorrow", and "pleasure", and may be primary information, which is the biometric information itself, such as the "heart rate", "respiratory rate", "perspiration amount", and the like.

The metadata generation unit 106 associates the user emotion information of each frame obtained by the user emotion analysis unit 105 with a frame number (time code), generates emotion metadata having the user emotion information of each frame of the moving image content A, and supplies the emotion metadata to the metadata database 107.

The metadata database 107 stores emotion metadata corresponding to a plurality of moving image content files. The metadata database 107 compiles the emotion metadata supplied from the metadata generation unit 106 into a database together with a moving image file name, that is, in association with the moving image file name so that it may be identified which moving image content file the emotion metadata corresponds to.

Here, in a case where the emotion metadata corresponding to the reproduction moving image file name (moving image content A) has not been stored yet, the emotion metadata supplied from the metadata generation unit 106 is directly stored. Furthermore, in a case where the emotion metadata corresponding to the reproduction moving image file name (moving image content A) has already been stored, the metadata database 107 performs an update with the emotion metadata supplied from the metadata generation unit 106.

Alternatively, in a case where the emotion metadata corresponding to the reproduction moving image file name (moving image content A) has already been stored, the metadata database 107 performs an update with emotion metadata obtained by combining the emotion metadata supplied from the metadata generation unit 106 with the already stored emotion metadata.

While weighted averaging is conceivable as a combining method, it is not limited thereto, and another method may be adopted. Note that, in the case of weighted averaging, when the emotion metadata that has already been added relates to m users, the emotion metadata that has already been added and the emotion metadata supplied from the metadata generation unit 106 are weighted by m:1 and averaged.

In a case of performing an update with the emotion metadata combined and obtained in this manner, the emotion metadata is updated and becomes more accurate emotion metadata as the number of users who view the moving image content A increases. In this case, while the emotion metadata generated by viewing of one user is metadata having emotion information of the one user, the emotion metadata generated by viewing of a large number of users is metadata having emotion information statistically representative from emotional reactions of other people.

Note that, at the time of generating the emotion metadata, it is conceivable to obtain highly accurate emotion metadata at a time by inputting facial images and biometric information related to a plurality of users to the user emotion analysis unit 105 for analysis instead of updating the emotion metadata with the moving image content sequentially being viewed by the plurality of users.

While the emotion metadata stored in the metadata database 107 and the moving image content file stored in the content database 101 are associated with each other by the moving image file name in the example illustrated in the drawing, they may be associated with each other by another method, for example, by recording link information, such as a uniform resource locator (URL) for accessing the emotion metadata stored in the metadata database 107, in the corresponding moving image content file of the content database 101.

As described above, according to the information processing device 100 illustrated in FIG. 1, the emotion metadata having the user emotion information for each frame of the moving image content is generated, and the emotion metadata is stored in the metadata database 107 in association with the moving image content file, which facilitates utilization of the emotion metadata associated with the moving image content file, for example.

[Exemplary Configuration of Information Processing Device for Generating Correlation Data]

Figure 2:
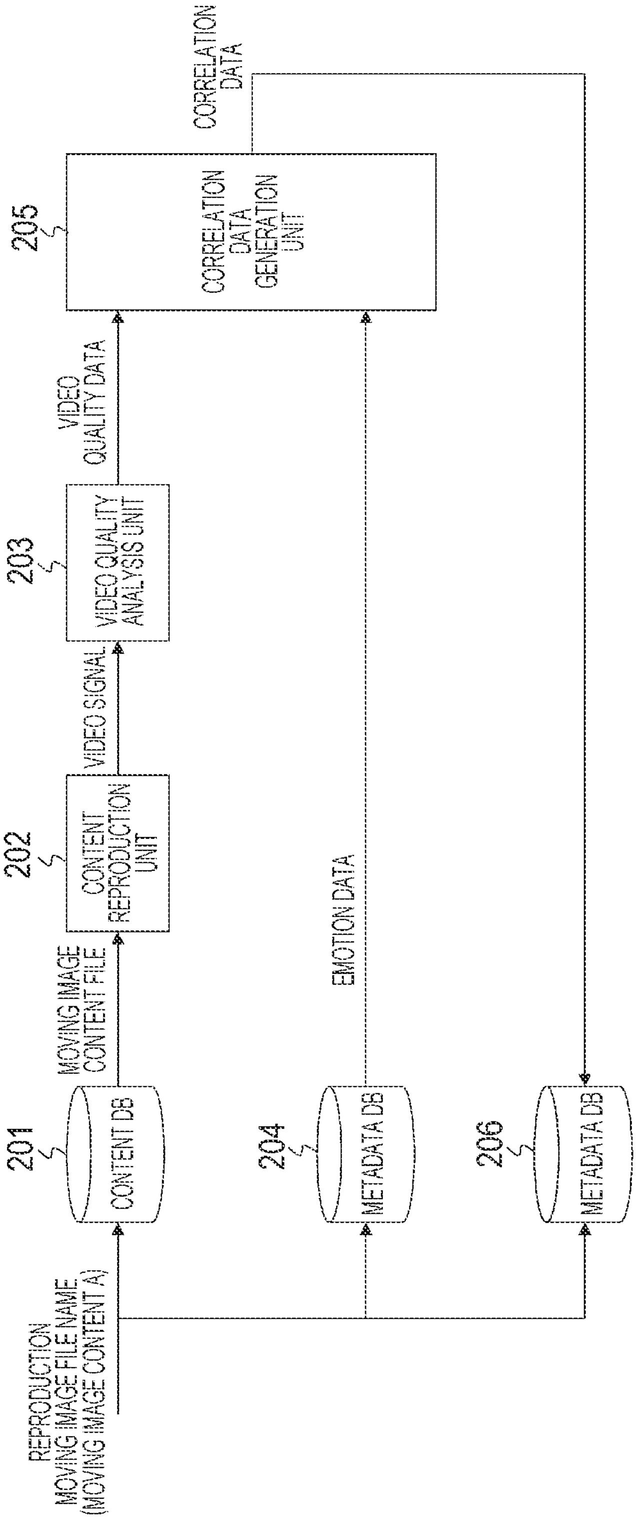
FIG. 2 is a block diagram illustrating an exemplary configuration of the information processing device that generates correlation data obtained by associating a user emotion with video quality.

FIG. 2 illustrates an exemplary configuration of an information processing device 200 that generates correlation data obtained by associating a user emotion with video quality. The information processing device 200 includes a content database (content DB) 201, a content reproduction unit 202, a video quality analysis unit 203, a metadata database (metadata DB) 204, a correlation data generation unit 205, and a metadata database (metadata DB) 206.

The content database 201 corresponds to the content database 101 illustrated in FIG. 1, and stores a plurality of moving image content files. When a reproduction moving image file name (moving image content A) is input, the content database 201 supplies, to the content reproduction unit 202, a moving image content file corresponding to the reproduction moving image file name. Here, the reproduction moving image file name is specified by a user of the information processing device 200, for example.

The content reproduction unit 202 reproduces the moving image content A included in the moving image content file supplied from the content database 201, and supplies video signals related to the moving image content A to the video quality analysis unit 203.

On the basis of the video signals of each frame supplied from the content reproduction unit 202, the video quality analysis unit 203 analyzes, for each frame, degrees of a hand-induced shake amount (correction remaining), a zoom speed condition, a focus deviation condition, and the like, obtains video quality data having video quality information for each frame of the moving image content A, and supplies it to the correlation data generation unit 205. Here, as the video quality information, a plurality of pieces of primary information such as the hand-induced shake amount (correction remaining), the zoom speed condition, the focus deviation condition, and the like may be used in parallel, or one piece of video quality information as secondary information obtained by integrating the plurality of pieces of primary information may be used.

For example, although detailed description is omitted, the video quality analysis unit 203 uses well-known machine learning or artificial intelligence (AI) technology to determine video quality for each frame with respect to content to be evaluated in advance. Note that it is possible to calculate some evaluation value depending on the quality even with a simple filter configuration without using the machine learning or AI technology.

The metadata database 204 corresponds to the metadata database 107 illustrated in FIG. 1, and stores the emotion metadata associated with the plurality of moving image content files stored in the content database 201. Note that, in this example, an example in which the association is performed with a moving image file name is illustrated.

When the reproduction moving image file name (moving image content A) same as that input to the content database 201 is input, the metadata database 204 supplies, to the correlation data generation unit 205, emotion metadata having the user emotion information for each frame of the moving image content A, which is associated with the moving image content file supplied from the content database 201 to the content reproduction unit 202.

On the basis of the video quality data supplied from the video quality analysis unit 203 and the emotion metadata supplied from the metadata database 204, that is, on the basis of the user emotion and the video quality for each frame of the moving image content A, the correlation data generation unit 205 generates correlation data in which the user emotion and the video quality are associated with each other, and supplies the correlation data to the metadata database 206.

The correlation data includes, for example, combination data of the user emotion and the video quality for each frame.

Figure 3A:
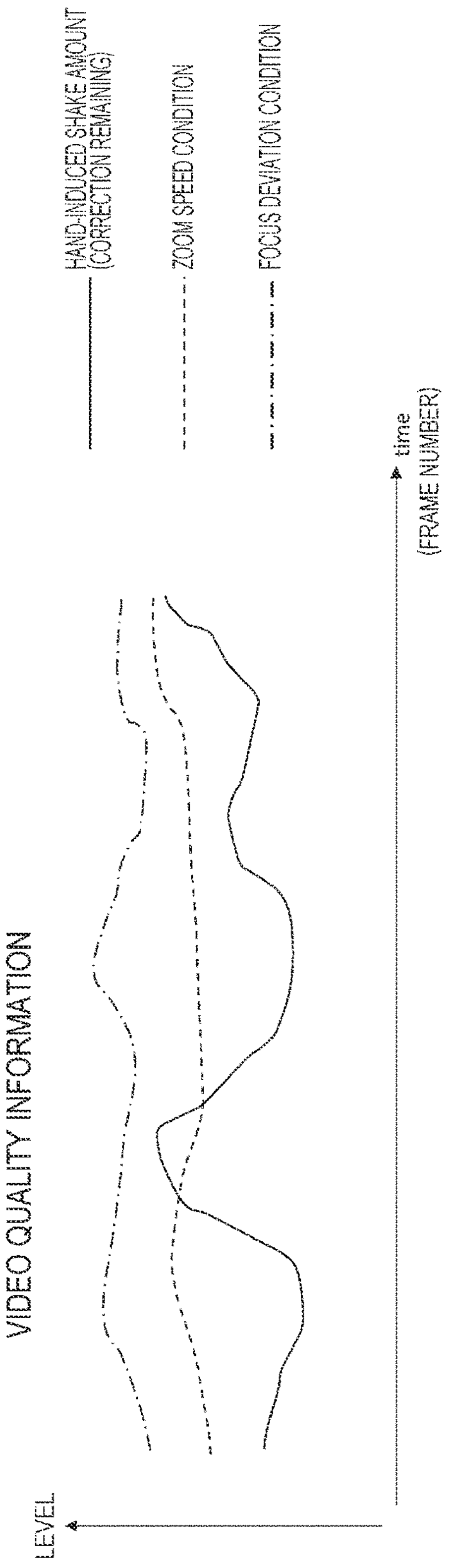
FIGS. 3A and 3B are diagrams illustrating an example of video quality information and user emotion information for each frame of moving image content A.
Figure 3B:
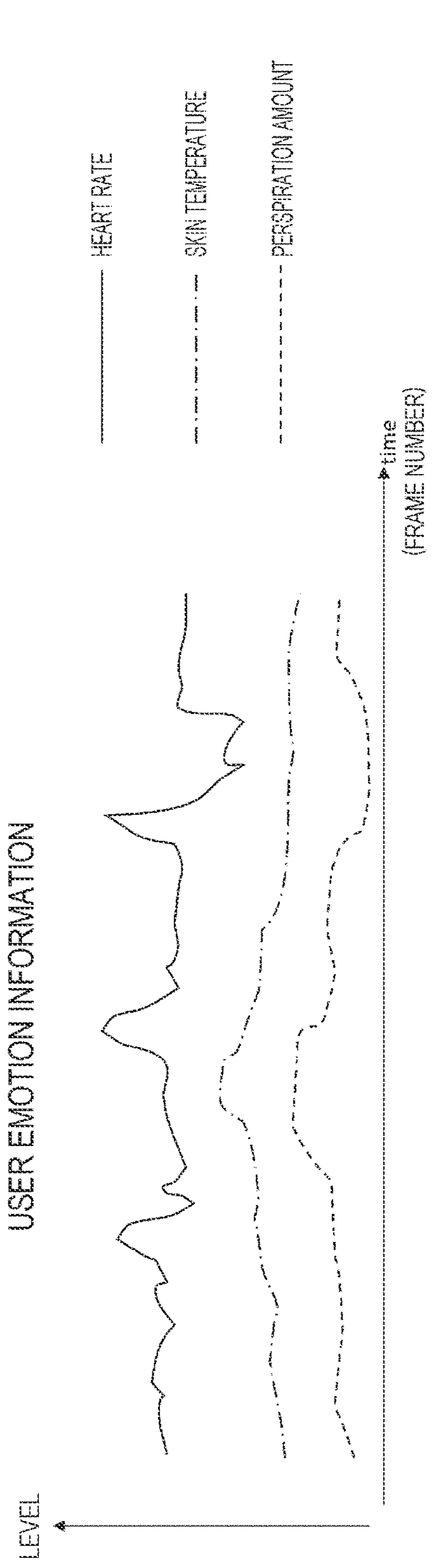

FIGS. 3A and 3B illustrate an example of the video quality information and the user emotion information for each frame of the moving image content A. FIG. 3A illustrates the video quality information. In this example, the video quality information includes three pieces of information (primary information) of a hand-induced shake amount (correction remaining), a zoom speed condition, and a focus deviation condition. In addition, FIG. 3B illustrates the user emotion information for each frame of the moving image content A. In this example, the emotion information includes three pieces of information (primary information) of a heart rate, a skin temperature, and a perspiration amount.

Figure 4:
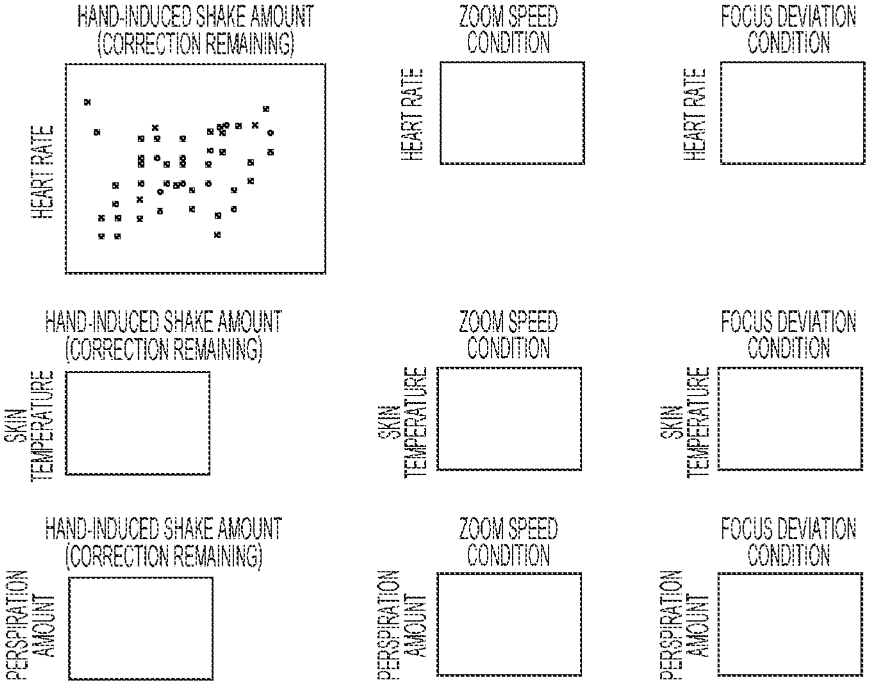
FIG. 4 is a scatter diagram illustrating the correlation data including combination data of the user emotion and the video quality for each frame.

FIG. 4 illustrates correlation data in that case in scatter diagrams. In this case, the correlation data includes combination data of each of the hand-induced shake amount (correction remaining), the zoom speed condition, and the focus deviation condition for each frame and each of the heart rate, the skin temperature, and the perspiration amount. Note that, in FIG. 4, display of points indicating the combination data is omitted in the scatter diagrams of other than the combination data of the hand-induced shake amount (correction remaining) and the heart rate for each frame.

Figure 5A:
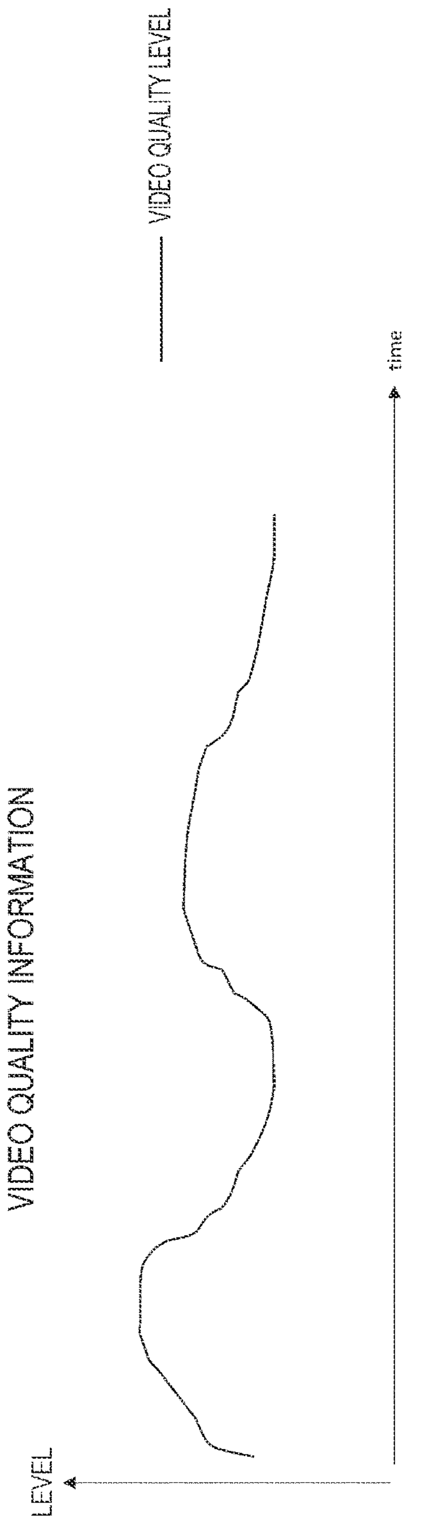
FIGS. 5A and 5B are diagrams illustrating another example of the video quality information and the user emotion information for each frame of the moving image content A.
Figure 5B:
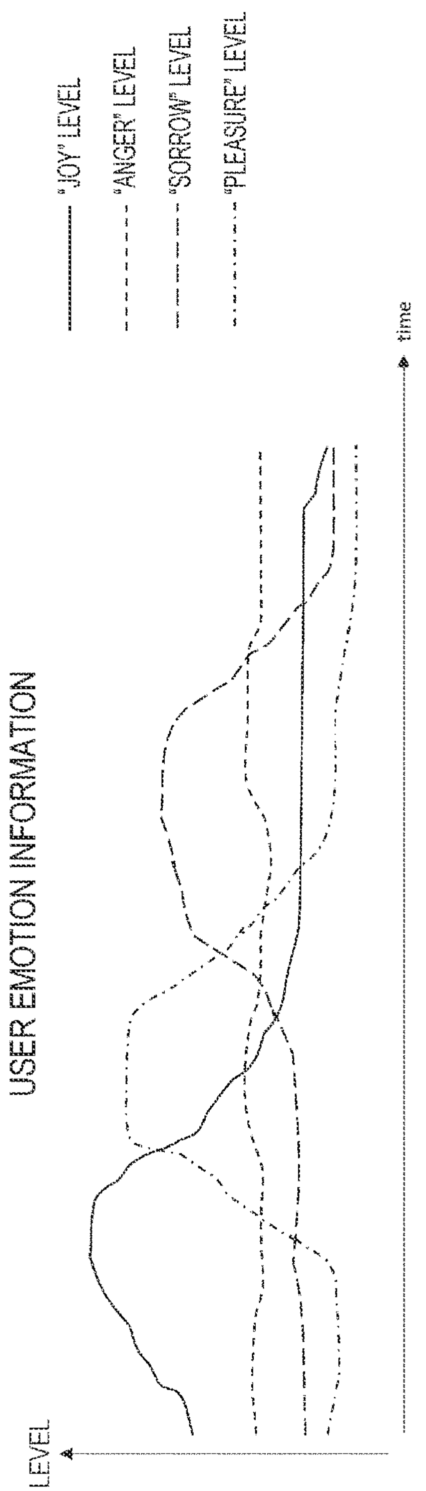

FIGS. 5A and 5B illustrate another example of the video quality information and the user emotion information for each frame of the moving image content A. FIG. 5A illustrates the video quality information. In this example, the video quality information includes one piece of information (secondary information) of the video quality obtained by integrating a plurality of pieces of information such as the hand-induced shake amount (correction remaining), the zoom speed condition, the focus deviation condition, and the like described above, and FIG. 5B illustrates the user emotion information for each frame of the moving image content A. In this example, the emotion information includes, for example, four pieces of information (secondary information) of "joy", "anger", "sorrow", and "pleasure".

FIG. 6 illustrates correlation data in that case in scatter diagrams. In this case, the correlation data includes combination data of a video quality level and each of the four levels of "joy", "anger", "sorrow", and "pleasure" for each frame. Note that, in FIG. 6, display of points indicating the combination data is omitted in the scatter diagrams of other than the combination data of the video quality level and the "joy" level for each frame.

Note that, while the exemplary case where both the video quality information and the user emotion information are the primary information or the secondary information has been described above, they may be not only the set of the primary information or the set of the secondary information but also a hybrid or a combination thereof.

The exemplary case where the correlation data includes the combination data of the user emotion and the video quality for each frame has been described above. In this case, since a large number of pieces of the combination data of the user emotion and the video quality are included as the correlation data, for example, it becomes possible to accurately calculate the user emotion corresponding to the video quality.

However, it is also conceivable that the correlation data is data of a regression equation calculated on the basis of the combination data of the user emotion and the video quality for each frame. For example, FIG. 7A illustrates, as a scatter diagram, combination data of a user emotion (y) and video quality (x) for each frame. FIG. 7B illustrates an example of a correlation coefficient and a regression equation (linear function) obtained by degenerating the combination data by a general statistical method. In this case, an inclination a, an intercept b, and a correlation coefficient r are stored as the correlation data.

FIG. 7C illustrates the use of the regression equation. By using this regression equation, it becomes possible to obtain the user emotion (y) from the video quality (x). In this case, it becomes possible not to use the correlation coefficient r if it is smaller because of lower reliability, or to actively use the correlation coefficient r if it is larger.

By using the correlation data as the data of the regression equation in this manner, it becomes possible to save the storage capacity of the database that stores the correlation data, and to easily calculate the user emotion corresponding to the video quality, for example. Furthermore, by adding the data of the correlation coefficient to the data of the regression equation, it becomes possible to easily and appropriately determine whether or not to use the regression equation.

Returning to FIG. 2, the metadata database 206 stores correlation metadata corresponding to the plurality of moving image content files. The metadata database 206 compiles the correlation data supplied from the correlation data generation unit 205 into a database together with a moving image file name so that it may be identified which moving image content file the emotion metadata corresponds to. Note that link information, such as a URL for accessing the correlation data stored in the metadata database 206, may be recorded as metadata in the corresponding moving image content file in the content database 201.

As described above, according to the information processing device 200 illustrated in FIG. 2, the correlation data obtained by associating the user emotion with the video quality is generated on the basis of the user emotion and the video quality for each scene of the moving image content A, which makes it possible to satisfactorily obtain the correlation data in which the user emotion and the video quality are associated with each other.

[Exemplary Configuration of Information Processing Device Using Correlation Data]

Figure 8:
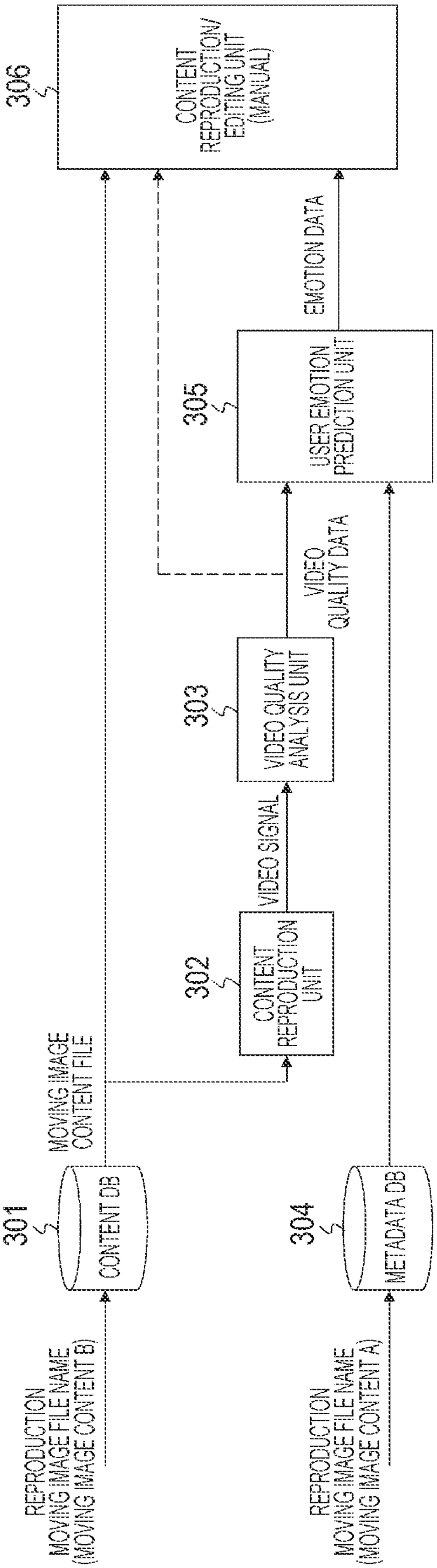
FIG. 8 is a block diagram illustrating an exemplary configuration of the information processing device that uses the correlation data obtained by associating the user emotion with the video quality.

FIG. 8 illustrates an exemplary configuration of an information processing device 300 that uses correlation data obtained by associating a user emotion with video quality. The information processing device 300 includes a content database (content DB) 301, a content reproduction unit 302, a video quality analysis unit 303, a metadata database (metadata DB) 304, a user emotion prediction unit 305, and a content reproduction/editing unit 306.

The content database 301 stores a plurality of moving image content files. When a reproduction moving image file name (moving image content B) is input, the content database 301 supplies a moving image content file corresponding to the reproduction moving image file name to the content reproduction unit 302 and the content reproduction/editing unit 306. Here, the reproduction moving image file name is specified by a user of the information processing device 300, for example.

The content reproduction unit 302 reproduces the moving image content B included in the moving image content file supplied from the content database 301, and supplies video signals related to the moving image content B to the video quality analysis unit 303.

The video quality analysis unit 303 is configured in a similar manner to the video quality analysis unit 203 illustrated in FIG. 2, and analyzes, for each frame, degrees of a hand-induced shake amount (correction remaining), a zoom speed condition, a focus deviation condition, and the like on the basis of the video signals of each frame supplied from the content reproduction unit 302, obtains video quality data having video quality information for each frame of the moving image content A, and supplies it to the user emotion prediction unit 305.

The metadata database 304 corresponds to the metadata database 206 illustrated in FIG. 2, and stores correlation data obtained by associating a user emotion with video quality corresponding to a plurality of moving image content files. When a reproduction moving image file name (moving image content A) is input, the metadata database 304 supplies the correlation data corresponding to the moving image content A to the user emotion prediction unit 305.

The user emotion prediction unit 305 predicts a user emotion for each frame of the moving image content B on the basis of the video quality for each frame of the moving image content B and the correlation data in which the user emotion and the video quality are associated with each other corresponding to the moving image content A, obtains emotion data having user emotion information for each frame of the moving image content B, and supplies it to the content reproduction/editing unit 306.

In the content reproduction/editing unit 306, a control unit (not illustrated) performs control to selectively reproduce a part of the moving image content B, or performs edit control to selectively retrieve a part of the moving image content B included in the moving image content file or selectively correct the video quality of a part of the moving image content B to generate new moving image content C, in response to a user operation.

As described above, the emotion data obtained by the user emotion prediction unit 305 has the user emotion information for each frame of the moving image content B, and indicates what kind of emotion the viewer has with respect to each frame of the moving image content B. In the content reproduction/editing unit 306, for example, a control unit (not illustrated) performs control to display a user interface (UI) indicating user emotion information for each frame of the moving image content B on the basis of the emotion data, and supports the user in performing a selective reproduction operation on the moving image content B, performing an edit operation for generating the new moving image content C by performing selective retrieval or video quality correction on the moving image content B, and the like.

Figure 9:
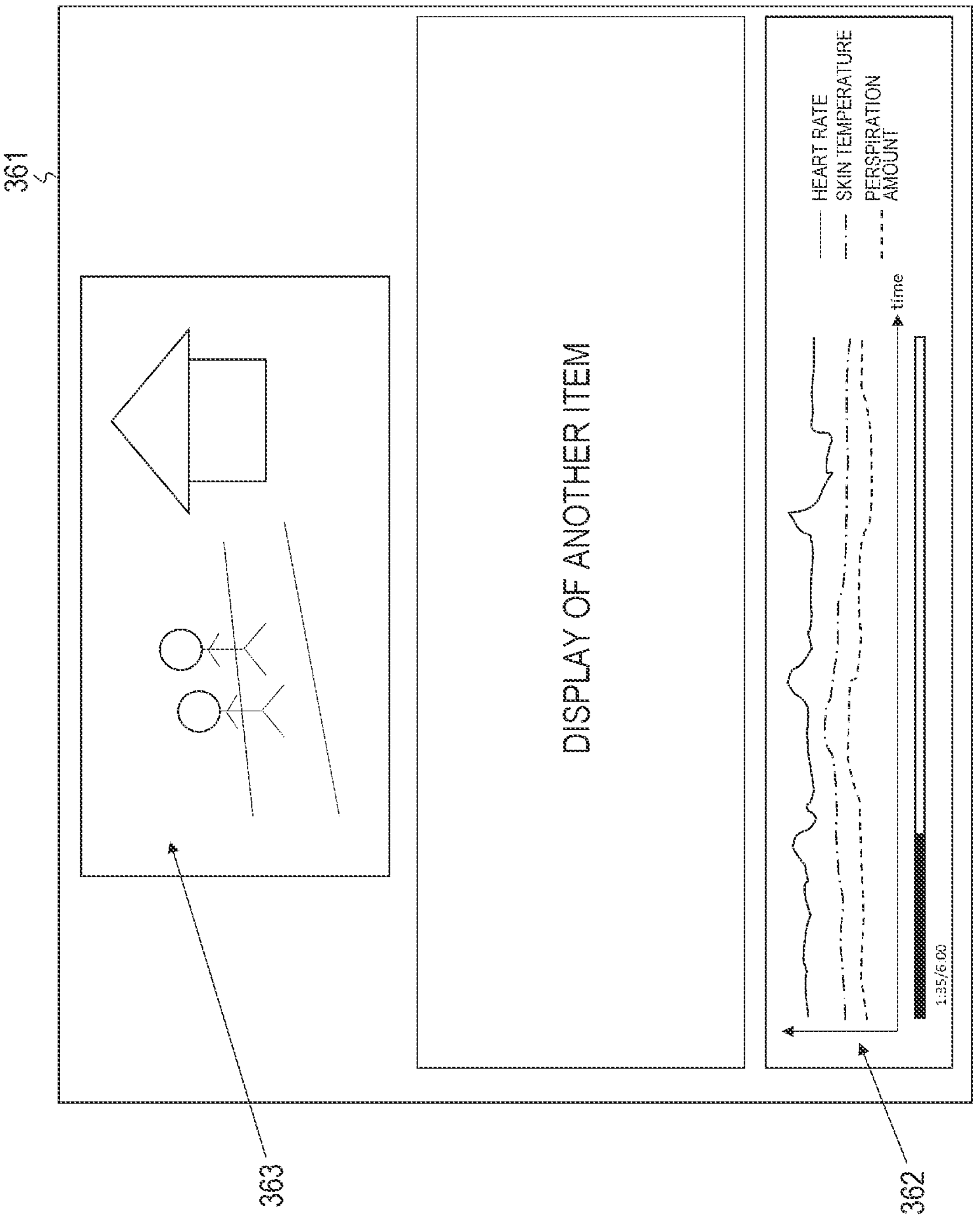
FIG. 9 is a diagram illustrating exemplary UI display displayed on a display unit of a content reproduction/editing unit.

FIG. 9 illustrates exemplary UI display displayed on a display unit 361 of the content reproduction/editing unit 306. In this example, there is a display area 362 in which the user emotion information (heart rate, skin temperature, and perspiration amount) for each frame of the moving image content B is displayed in association with a time-axis slide bar indicating progress of reproduction of the moving image content on the lower side, and there is a display area 363 in which reproduced video is displayed on the upper side.

Figure 10:
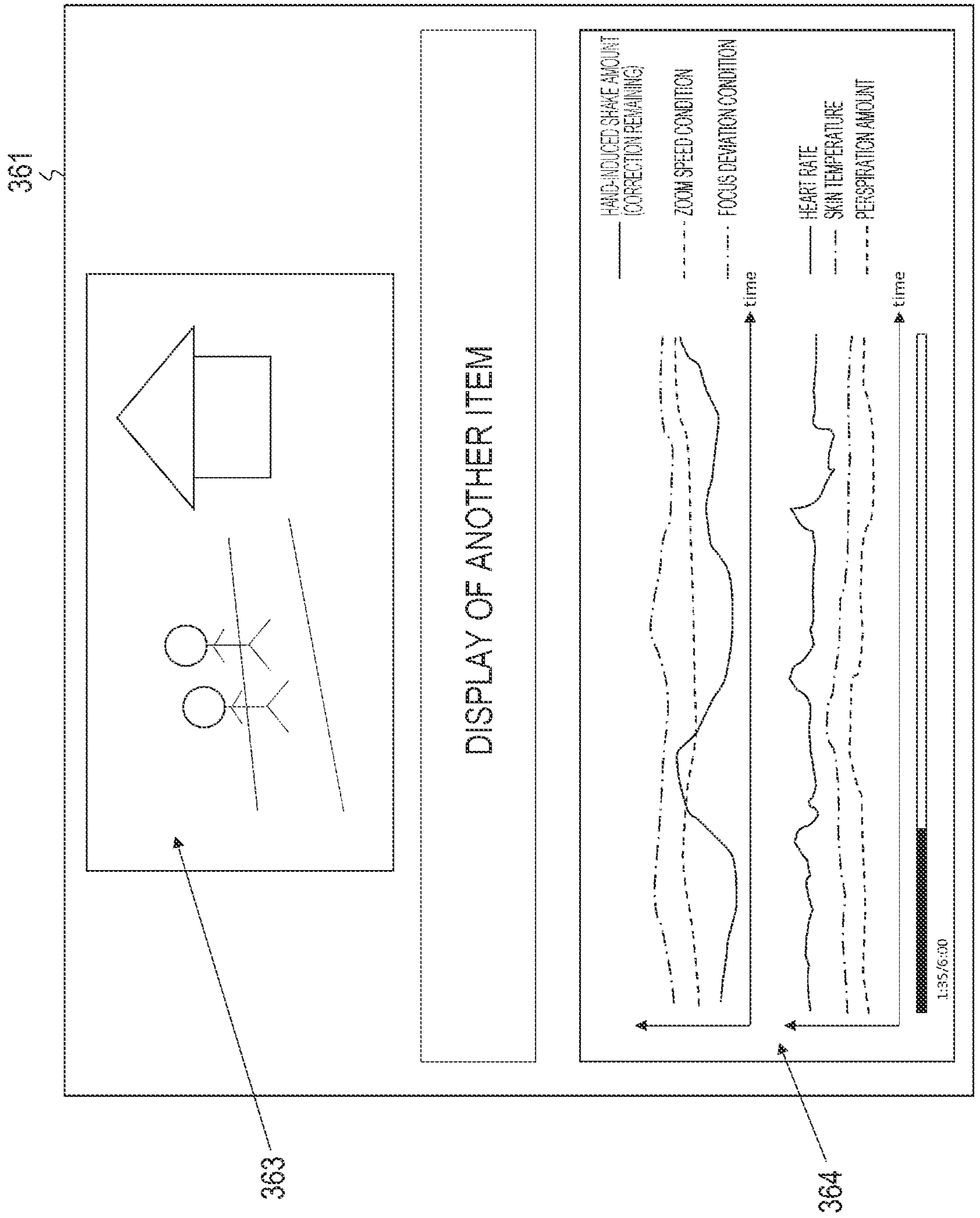
FIG. 10 is a diagram illustrating another exemplary UI display displayed on a display unit of a content reproduction/editing unit.

FIG. 10 illustrates another exemplary UI display displayed on the display unit 361 of the content reproduction/editing unit 306. In this example, there is a display area 364 in which the user emotion information (heart rate, skin temperature, and perspiration amount) for each frame of the moving image content B and the video quality information (hand-induced shake amount (correction remaining), zoom speed condition, and focus deviation condition) for each frame of the moving image content B are displayed in association with a time-axis slide bar indicating progress of reproduction of the moving image content on the lower side, and there is the display area 363 in which reproduced video is displayed on the upper side. In this case, as indicated by a broken line in FIG. 8, the video quality data obtained by the video quality analysis unit 303 is supplied to the content reproduction/editing unit 306, and the video quality information is displayed for each frame of the moving image content B on the basis of the video quality data.

As described above, according to the information processing device 300 illustrated in FIG. 8, the user emotion prediction unit 305 predicts user emotion for each frame of the moving image content B on the basis of the correlation data obtained by associating the video quality for each frame of the moving image content B with the user emotion and the video quality related to the moving image content A, which makes it possible to satisfactorily predict the user emotion for each frame of the moving image content B.

Furthermore, according to the information processing device 300 illustrated in FIG. 8, the content reproduction/editing unit 306 displays the user emotion for each scene of the moving image content B on the basis of the emotion data having the user emotion information for each frame of the moving image content B obtained by the user emotion prediction unit 305, which allows the user to easily recognize the user emotion predicted for each frame of the moving image content B, and to easily and effectively perform a selective reproduction operation on the moving image content B and an edit operation for performing selective retrieval or video quality correction on the moving image content B.

Note that, according to the information processing device 300 illustrated in FIG. 8, by inputting the moving image content C newly generated by the content reproduction/editing unit 306 again as content corresponding to the moving image content B, the user emotion prediction unit 305 is enabled to predict the user emotion for each frame of the image content C for utilization in checking a perfection level of the moving image content C, which leads to completion of higher-quality moving image content, and enables provision of assistance in a creative activity of a creator.

[Another Exemplary Configuration of Information Processing Device Using Correlation Data]

Figure 11:
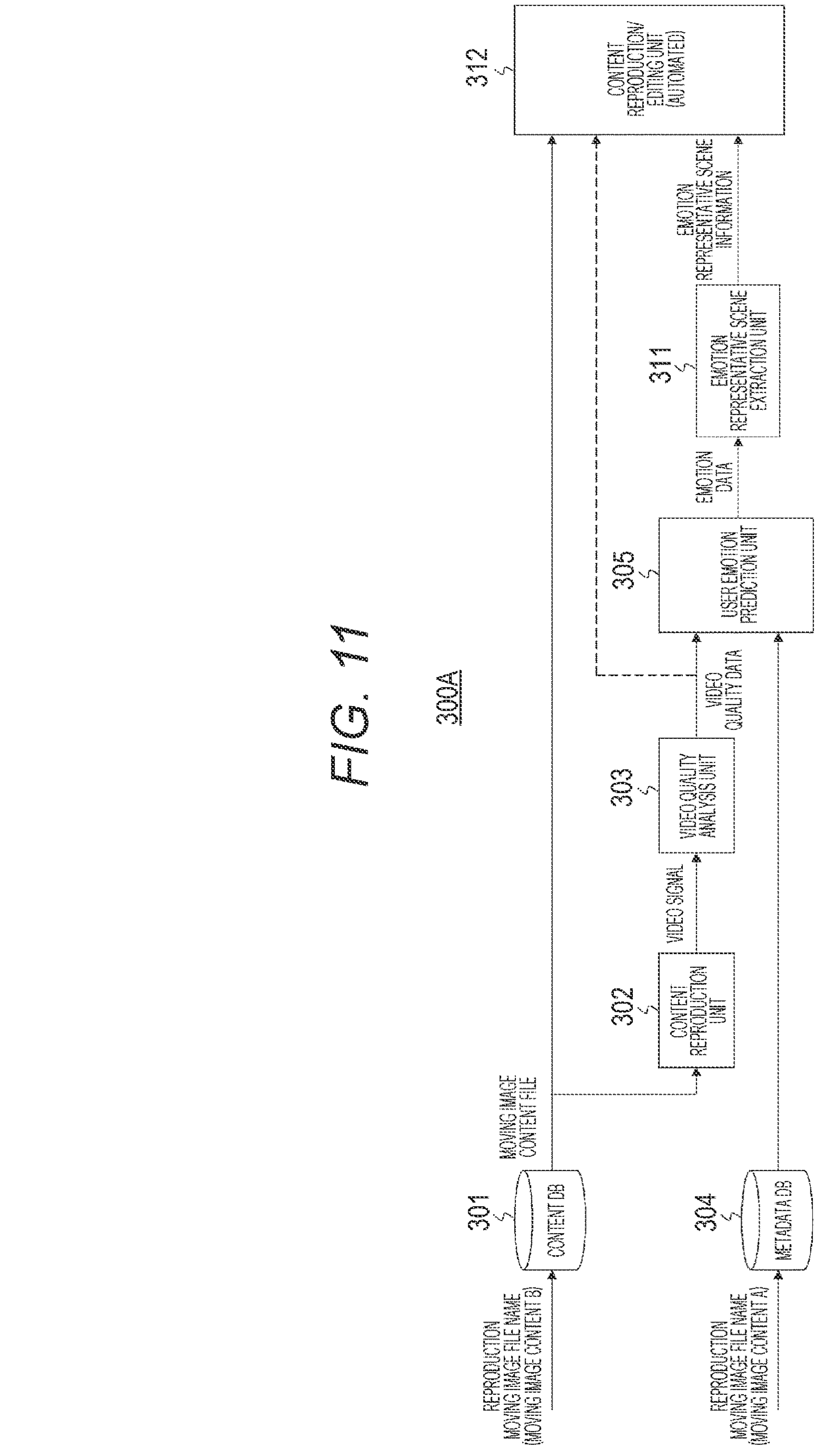
FIG. 11 is a block diagram illustrating an exemplary configuration of another information processing device that uses the correlation data obtained by associating the user emotion with the video quality.

FIG. 11 illustrates an exemplary configuration of an information processing device 300A that uses correlation data obtained by associating a user emotion with video quality. In FIG. 11, portions corresponding to those in FIG. 8 are denoted by the same reference numerals, and detailed description thereof is appropriately omitted.

The information processing device 300A includes the content database (content DB) 301, the content reproduction unit 302, the video quality analysis unit 303, the metadata database (metadata DB) 304, the user emotion prediction unit 305, an emotion representative scene extraction unit 311, and a content reproduction/editing unit 312.

When a reproduction moving image file name (moving image content B) is input, the content database 301 supplies a moving image content file corresponding to the reproduction moving image file name to the content reproduction unit 302 and the content reproduction/editing unit 312. When a reproduction moving image file name (moving image content A) is input, the metadata database 304 supplies the correlation data corresponding to the moving image content A to the user emotion prediction unit 305.

The content reproduction unit 302 reproduces the moving image content B included in the moving image content file supplied from the content database 301, and supplies video signals related to the moving image content B to the video quality analysis unit 303. On the basis of the video signals of each frame supplied from the content reproduction unit 302, the video quality analysis unit 303 analyzes, for each frame, degrees of a hand-induced shake amount (correction remaining), a zoom speed condition, a focus deviation condition, and the like, obtains video quality data having video quality information for each frame of the moving image content A, and supplies it to the user emotion prediction unit 305.

The user emotion prediction unit 305 predicts a user emotion for each frame of the moving image content B on the basis of the video quality for each frame of the moving image content B and the correlation data in which the user emotion and the video quality are associated with each other corresponding to the moving image content A, obtains emotion data having user emotion information for each frame of the moving image content B, and supplies it to the emotion representative scene extraction unit 311.

The emotion representative scene extraction unit 311 extracts an emotion representative scene from the emotion metadata supplied from the user emotion prediction unit 305.

For example, the emotion representative scene extraction unit 311 extracts an emotion representative scene on the basis of a type of the user emotion. In this case, for example, in a case where the emotion metadata includes information regarding "joy", "anger", "sorrow", and "pleasure" as the user emotion information for each frame of the moving image content, one of those emotions is selected, and a scene in which a degree (level) of the emotion is equal to or higher than a threshold is extracted as the emotion representative scene. Here, the selection of the emotion and the setting of the threshold may be optionally performed by a user operation, for example.

Furthermore, the emotion representative scene extraction unit 311 extracts the emotion representative scene on the basis of a degree of the user emotion, for example. In this case, it is conceivable to (1) extract a scene in which a degree of the user emotion exceeds a threshold as the emotion representative scene, or (2) extract a scene as the emotion representative scene on the basis of a statistical value of the degree of the user emotion of the entire moving image content.

First, (1) a case where a scene in which a degree of the user emotion exceeds a threshold is extracted as the emotion representative scene will be described. In this case, for example, in a case where the emotion metadata includes information regarding "joy", "anger", "sorrow", and "pleasure" as the user emotion information for each frame of the moving image content, a scene in which a degree (level) of the emotion is equal to or higher than a threshold is extracted as the emotion representative scene in each of the emotions. Here, the threshold may be optionally set by a user operation, for example.

Figure 12B:
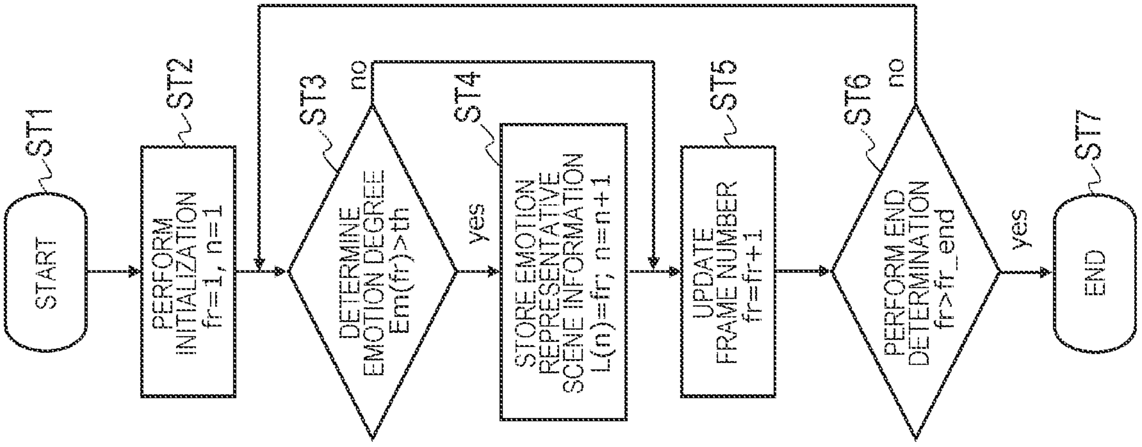
FIGS. 12A and 12B are diagrams for explaining a case where a scene in which a degree of the user emotion exceeds a threshold is extracted as an emotion representative scene.
Figure 12A:
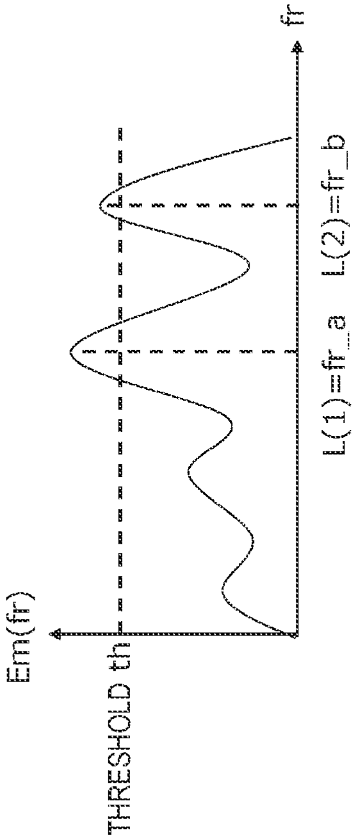

FIG. 12A illustrates an exemplary change in the degree (level) of a predetermined user emotion for each frame. Here, the horizontal axis represents a frame number fr, and the vertical axis represents a degree Em (fr) of the user emotion. In the case of this example, since the degree Em (fr_a) exceeds the threshold th at the frame number fr_a, the frame number fr_a is stored as emotion representative scene information L(1), and since the degree Em (fr_b) exceeds the threshold th at the frame number fr_b, the frame number fr_b is stored as emotion representative scene information L(2).

A flowchart of FIG. 12B illustrates an exemplary processing procedure of the emotion representative scene extraction unit 311 in the case where a scene in which the degree of the user emotion exceeds the threshold is extracted as the emotion representative scene.

First, the emotion representative scene extraction unit 311 starts a process in step ST1. Next, the emotion representative scene extraction unit 311 initializes the frame number fr=1, and n=1 in step ST2.

Next, the emotion representative scene extraction unit 311 determines whether or not the degree Em(fr) is higher than the threshold th in step ST3. When Em(fr)>th is satisfied, the emotion representative scene extraction unit 311 stores the emotion representative scene information, that is, stores the frame number fr_as the emotion representative scene L (n) in step ST4. Furthermore, the emotion representative scene extraction unit 311 increments n to be n+1 in step ST4.

Next, the emotion representative scene extraction unit 311 updates the frame number fr to fr=fr+1 in step ST5. The frame number fr is updated in step ST5 in a similar manner when Em(fr)>th is not satisfied in step ST3.

Next, in step ST6, the emotion representative scene extraction unit 311 determines whether or not the frame number fr is larger than the final frame number fr_end, that is, performs end determination. When fr>fr_end is not satisfied, the emotion representative scene extraction unit 311 returns to the processing of step ST3, and repeats the process in a similar manner to the process described above. On the other hand, when fr>fr_end is satisfied, the emotion representative scene extraction unit 311 terminates the process in step ST7.

Next, (2) a case where the emotion representative scene is extracted on the basis of the statistical value of the degree of the user emotion of the entire moving image content will be described. The statistical value in this case is a maximum value, a sorting result, an average value, a standard deviation value, or the like.

When the statistical value is a maximum value, for example, in a case where the emotion metadata includes information regarding "joy", "anger", "sorrow", and "pleasure" as the user emotion information for each frame of the moving image content, a scene in which a degree (level) of the emotion is the maximum value is extracted as the emotion representative scene in each of the emotions.

Furthermore, when the statistical value is a sorting result, for example, in a case where the emotion metadata includes information regarding "joy", "anger", "sorrow", and "pleasure" as the user emotion information for each frame of the moving image content, not only a scene in which a degree (level) of the emotion is the maximum value but also scenes ranked second and third in the degree are extracted as the emotion representative scene in each of the emotions.

Furthermore, when the statistical value is an average value or standard deviation, for example, in a case where the emotion metadata includes information regarding "joy", "anger", "sorrow", and "pleasure" as the user emotion information for each frame of the moving image content, a scene in which a degree (level) of the emotion largely deviates (e.g., three times the standard deviation, etc.) from the average is extracted as the emotion representative scene in each of the emotions.

Figure 13B:
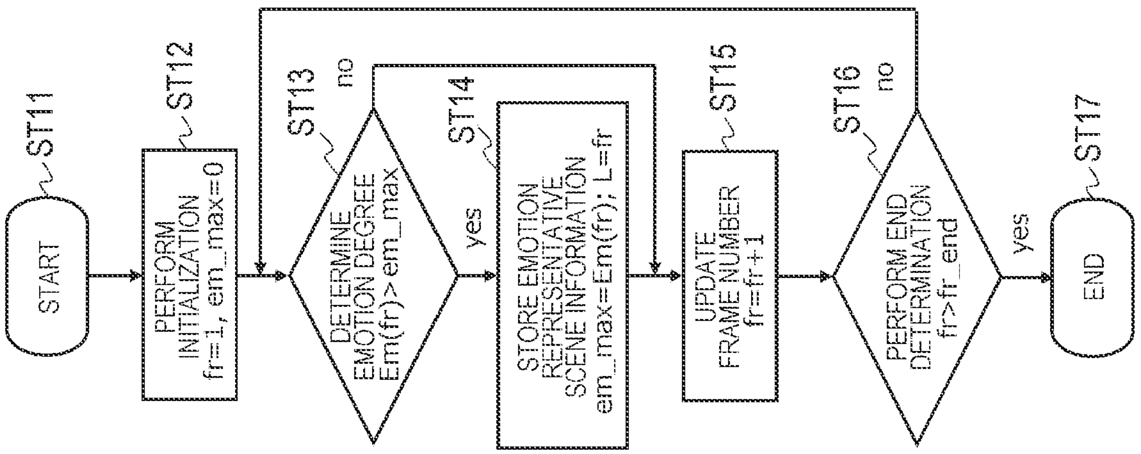
FIGS. 13A and 13B are diagrams for explaining a case where the emotion representative scene is extracted on the basis of a statistical value of the degree of the user emotion of the entire moving image content.
Figure 13A:
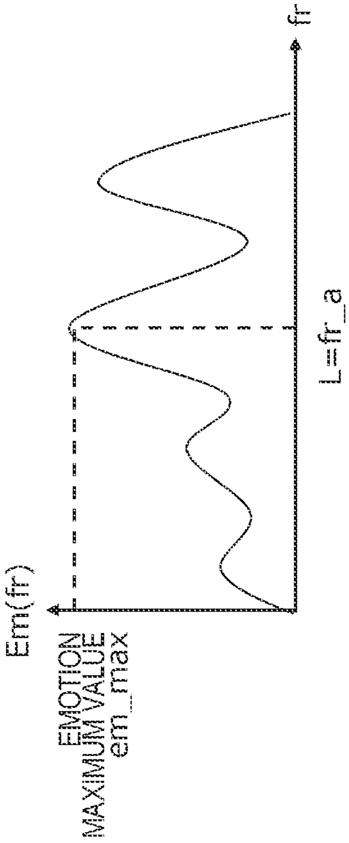

FIG. 13A illustrates an exemplary change in the degree (level) of a predetermined user emotion for each frame. Here, the horizontal axis represents a frame number fr, and the vertical axis represents a degree Em (fr) of the user emotion. In the case of this example, since the degree Em (fr_a) of the frame number fr_a is the maximum value em_max, the frame number fr_a is stored as the emotion representative scene information L.

A flowchart of FIG. 13B illustrates an exemplary processing procedure of the emotion representative scene extraction unit 311 in the case where a scene in which the degree of the user emotion in the entire moving image content is the maximum value is extracted as the emotion representative scene.

First, the emotion representative scene extraction unit 311 starts a process in step ST11. Next, the emotion representative scene extraction unit 311 initializes the frame number fr=1 and the maximum value em_max=0 in step ST12.

Next, the emotion representative scene extraction unit 311 determines whether or not the degree Em(fr) is higher than the maximum value em_max in step ST13. When Em(fr)>em_max is satisfied, the emotion representative scene extraction unit 311 stores the emotion representative scene information, that is, stores the frame number fr_as the emotion representative scene L in step ST14. Furthermore, the emotion representative scene extraction unit 311 updates em_max to Em(fr) in step ST14.

Next, the emotion representative scene extraction unit 311 updates the frame number fr to fr=fr+1 in step ST15. The frame number fr is updated in step ST15 in a similar manner when Em(fr)>em_max is not satisfied in step ST13.

Next, in step ST16, the emotion representative scene extraction unit 311 determines whether or not the frame number fr is larger than the final frame number fr_end, that is, performs end determination. When fr>fr_end is not satisfied, the emotion representative scene extraction unit 311 returns to the processing of step ST13, and repeats the process in a similar manner to the process described above. On the other hand, when fr>fr_end is satisfied, the emotion representative scene extraction unit 311 terminates the process in step ST17.

Returning to FIG. 11, the emotion representative scene extraction unit 311 supplies the emotion representative scene information to the content reproduction/editing unit 312. In the content reproduction/editing unit 312, a control unit (not illustrated) performs control to selectively reproduce a part of the moving image content B included in the moving image content file supplied from the content database 301 on the basis of the emotion representative scene information supplied from the emotion representative scene extraction unit 311. In this case, for example, only the emotion representative scene may be reproduced or other parts excluding the emotion representative scene may be reproduced according to the user setting.

Furthermore, in the content reproduction/editing unit 312, a control unit (not illustrated) performs control to selectively extract a part of the moving image content B included in the moving image content file supplied from the content database 301 to generate new moving image content C on the basis of the emotion representative scene information supplied from the emotion representative scene extraction unit 311. In this case, for example, only the emotion representative scene may be extracted or other parts excluding the emotion representative scene may be extracted according to the user setting.

Furthermore, in the content reproduction/editing unit 312, a control unit (not illustrated) performs control to selectively correct the video quality of a part of the moving image content B included in the moving image content file supplied from the content database 301 to generate new moving image content C on the basis of the emotion representative scene information supplied from the emotion representative scene extraction unit 311.

Note that the content reproduction/editing unit 312 may use not only the emotion representative scene information supplied from the emotion representative scene extraction unit 311 but also other evaluation values conventionally used. Alternatively, as illustrated by a broken line in FIG. 11, it is conceivable that the content reproduction/editing unit 312 uses not only the emotion representative scene information supplied from the emotion representative scene extraction unit 311 but also the video quality data from the video quality analysis unit 303 together as an evaluation value.

As described above, according to the information processing device 300A illustrated in FIG. 11, the emotion representative scene extraction unit 311 extracts the emotion representative scene on the basis of the predicted user emotion for each scene of the moving image content B, which makes it possible to effectively use the predicted user emotion for each scene of the moving image content B in reproduction and editing of the moving image content.

For example, when the creator creates new moving image content C from the moving image content B, it becomes possible to automatically perform editing work based on a scene for which the viewer is likely to show likes or dislikes in advance. That is, it becomes possible for the creator to perform editing work based on the index, which results in provision of assistance in creating high-quality moving image content C.

<2. Variations>

Note that, although not described above, it is also conceivable to adopt a configuration in which the information processing device 100 (see FIG. 1) generates emotion metadata for each attribute, such as generation, gender, country, and the like, the information processing device 200 (see FIG. 2) generates correlation data for each attribute using the emotion data for each attribute, and the information processing devices 300 and 300A (see FIGS. 8 and 11) are capable of supplying, to the user emotion prediction unit 305, correlation data of a predetermined attribute selected by the user using, for example, the UI from the metadata database 304. In this case, the user emotion prediction unit 305 of the information processing devices 300 and 300A predicts the user emotion for each scene of the moving image content on the basis of the correlation data of the predetermined attribute. With this arrangement, the user emotion prediction unit 305 is enabled to obtain emotion data suitable for the attribute desired by the user for use in reproduction and editing of the moving image content B.

Furthermore, it has been described that the moving image content A is one content in the embodiment above. However, the moving image content A may be a plurality of pieces of content. In that case, in the information processing device 200 in FIG. 2, one piece of correlation data is generated for a large number of pieces of moving image content, thereby statistically improving the quality of the correlation data.

Furthermore, an exemplary case where each scene is configured by one frame has been described in the embodiment above. However, each scene may be configured by a plurality of frames.

Furthermore, while the preferred embodiment of the present disclosure has been described in detail with reference to the accompanying drawings, the technical scope of the present disclosure is not limited to such example. It is apparent that a person having ordinary knowledge in the technical field of the present disclosure may conceive various changes or modifications within the scope of the technical idea recited in claims, and it is naturally understood that they also belong to the technical scope of the present disclosure.

Furthermore, the effects described in the present specification are merely exemplary or illustrative, and are not restrictive. That is, the technology according to the present disclosure may exert other effects apparent to those skilled in the art from the description of the present specification in addition to or instead of the effects described above.

Furthermore, the present technology may also have the following configurations.

(1) An information processing device including:
a data generation unit that generates correlation data obtained by associating a user emotion with video quality on the basis of the user emotion and the video quality for each scene of moving image content.

(2) The information processing device according to (1) described above, in which
the correlation data includes combination data of the user emotion and the video quality for each scene.

(3) The information processing device according to (1) described above, in which
the correlation data includes data of a regression equation calculated on the basis of combination data of the user emotion and the video quality for each scene.

(4) The information processing device according to (3) described above, in which
data of a correlation coefficient is added to the data of the regression equation.

(5) The information processing device according to any one of (1) to (4) described above, in which
the data generation unit generates the correlation data for each user attribute using the user emotion for each user attribute.

(6) An information processing method including:
generating correlation data obtained by associating a user emotion with video quality on the basis of the user emotion and the video quality for each scene of moving image content.

(7) An information processing device including:
a user emotion prediction unit that predicts, on the basis of video quality for each scene of moving image content and correlation data obtained by associating a user emotion with the video quality, the user emotion for each scene of the moving image content.

(8) The information processing device according to (7) described above, further including:
a display control unit that controls display of the predicted user emotion for each scene of the moving image content.

(9) The information processing device according to (7) described above, further including:
an extraction unit that extracts an emotion representative scene on the basis of the predicted user emotion for each scene of the moving image content.

(10) The information processing device according to (9) described above, in which
the extraction unit extracts the emotion representative scene on the basis of a type of the user emotion.

(11) The information processing device according to (9) described above, in which
the extraction unit extracts the emotion representative scene on the basis of a degree of the user emotion.

(12) The information processing device according to (11) described above, in which
the extraction unit extracts a scene in which the degree of the user emotion exceeds a threshold as the emotion representative scene.

(13) The information processing device according to (11) described above, in which
the extraction unit extracts the emotion representative scene on the basis of a statistical value of the degree of the user emotion of the entire moving image content.

(14) The information processing device according to (13) described above, in which
the statistical value includes a maximum value, a sorting result, an average value, or a standard deviation value.

(15) The information processing device according to any one of (7) to (14) described above, in which
the user emotion prediction unit predicts the user emotion for each scene of the moving image content on the basis of the correlation data of a predetermined attribute selected from the correlation data for each user attribute.

(16) The information processing device according to any one of (7) to (15) described above, further including:
a reproduction control unit that controls reproduction of the moving image content on the basis of the extracted emotion representative scene.

(17) The information processing device according to any one of (7) to (16) described above, further including:
an edit control unit that controls editing of the moving image content on the basis of the extracted emotion representative scene.

(18) An information processing method including:
predicting, on the basis of video quality for each scene of moving image content and correlation data obtained by associating a user emotion with the video quality, the user emotion for each scene of the moving image content.

REFERENCE SIGNS LIST

100 Information processing device
101 Content database (Content DB)
102 Content reproduction unit
103 Facial image shooting camera
104 Biometric information sensor
105 User emotion analysis unit
106 Metadata generation unit
107 Metadata database (Metadata DB)
200 Information processing device
201 Content database (Content DB)
202 Content reproduction unit
203 Video quality analysis unit
204 Metadata database (Metadata DB)
205 Correlation data generation unit
206 Metadata database (Metadata DB)
300, 300A Information processing device
301 Content database (Content DB)
302 Content reproduction unit
303 Video quality analysis unit
304 Metadata database (Metadata DB)
305 User emotion prediction unit
306 Content reproduction/editing unit
311 Emotion representative scene extraction unit
312 Content reproduction/editing unit

The invention claimed is:

1. An information processing device, comprising:
circuitry configured to:
receive video quality data associated with a plurality of scenes of moving image content, wherein the video quality data includes video quality information of each scene of the plurality of scenes;
receive emotion data associated with the plurality of scenes of moving image content, wherein the emotion data includes first user emotion information of each scene of the plurality of scenes;
associate the first user emotion information of each scene of the plurality of scenes with the video quality information of a corresponding scene of the plurality of scenes; and
generate first correlation data based on the association of the first user emotion information of each scene of the plurality of scenes with the video quality information of the corresponding scene of the plurality of scenes.

2. The information processing device according to claim 1, wherein
the first correlation data includes combination data, and
the combination data includes the first user emotion information of each scene of the plurality of scenes and the video quality information of each scene of the plurality of scenes.

3. The information processing device according to claim 1, wherein
the circuitry is further configured to determine data of a regression equation based on combination data,
the combination data includes the first user emotion information of each scene of the plurality of scenes and the video quality information of each scene of the plurality of scenes, and
the first correlation data includes the data of the regression equation.

4. The information processing device according to claim 3, wherein the circuitry is further configured to add data of a correlation coefficient to the data of the regression equation.

5. The information processing device according to claim 1, wherein
the circuitry is further configured to generate second correlation data for each user attribute of a plurality of user attributes based on second user emotion information of a corresponding user attribute of the plurality of user attributes,
the second correlation data includes the first correlation data, and
the second user emotion information includes the first user emotion information of each scene of the plurality of scenes.

6. The information processing device according to claim 1, wherein the video quality information of each scene of the plurality of scenes includes at least one of:
a hand-induced shake amount associated with the corresponding scene of the plurality of scenes,
a zoom speed condition associated with the corresponding scene of the plurality of scenes, or
a focus deviation condition associated with the corresponding scene of the plurality of scenes.

7. An information processing method, comprising:
receiving video quality data associated with a plurality of scenes of moving image content, wherein the video quality data includes video quality information of each scene of the plurality of scenes;
receiving emotion data associated with the plurality of scenes of moving image content, wherein the emotion data includes user emotion information of each scene of the plurality of scenes;
associating the user emotion information of each scene of the plurality of scenes with the video quality information of a corresponding scene of the plurality of scenes; and
generating correlation data based on the association of the user emotion information of each scene of the plurality of scenes with the video quality information of the corresponding scene of the plurality of scenes.

8. An information processing device, comprising:
circuitry configured to:
predict user emotion for each scene of a plurality of scenes of moving image content based;
video quality information of a corresponding scene of the plurality of scenes of the moving image content, and
first correlation data, wherein in the first correlation data, user emotion information is associated with the video quality information; and
extract, among the plurality of scenes, a scene as an emotion representative scene based on a degree of the predicted user emotion, wherein in the extracted scene, the degree of the user emotion exceeds a threshold.

9. The information processing device according to claim 8, wherein the circuitry is further configured to control display of the predicted user emotion.

10. The information processing device according to claim 8, wherein the circuitry is further configured to extract the emotion representative scene based on a type of the predicted user emotion.

11. The information processing device according to claim 8, wherein the circuitry is further configured to extract the emotion representative scene based on a statistical value of the degree of the predicted user emotion.

12. The information processing device according to claim 11, wherein the statistical value includes at least one of:

a maximum value of the degree of the predicted user emotion, a sorting result of the degree of the predicted user emotion, an average value of the degree of the predicted user emotion, or a standard deviation value of the degree of the predicted user emotion.

13. The information processing device according to claim 8, wherein the circuitry is further configured to:

select, from second correlation data of each attribute of a plurality of attributes, the first correlation data of a specific attribute of the plurality of attributes; and predict the user emotion for each scene of the moving image content based on the selected first correlation data.

14. The information processing device according to claim 8, wherein the circuitry is further configured to control reproduction of the moving image content based on the extracted emotion representative scene.

15. The information processing device according to claim 8, wherein the circuitry is further configured to control an editing operation of the moving image content based on the extracted emotion representative scene.

16. An information processing method, comprising:

predicting user emotion for each scene of a plurality of scenes of moving image content based on:

video quality information of a corresponding scene of the plurality of scenes of the moving image content, and correlation data, wherein the correlation data, user emotion information is associated with the video quality information; and extracting, among the plurality of scenes, a scene as an emotion representative scene based on a degree of the predicted user emotion, wherein in the extracted scene, the degree of the user emotion exceeds a threshold.

* * * * *